Oct. 21, 1947.　　C. J. OETZEL　　2,429,524
CHUCK
Filed Oct. 14, 1944

INVENTOR.
Carl J. Oetzel
BY
Evans + McCoy
ATTORNEYS

Patented Oct. 21, 1947

2,429,524

UNITED STATES PATENT OFFICE 2,429,524

CHUCK

Carl J. Oetzel, North Olmsted, Ohio, assignor to The Oster Manufacturing Company, Cleveland, Ohio, a corporation of Ohio Application October 14, 1944, Serial No. 558,678

3 Claims. (Cl. 279—114)

This invention relates to work gripping chucks of the type used on lathes, and more particularly to a manually operable adjusting and locking device for the work gripping jaws.

The invention has for its object to provide a simple, rugged and compact chuck in which the jaw actuating and locking scroll disk is housed within a hand wheel that has considerable weight in its periphery and that has a direct impact driving connection with the disk, so that the disk may be hammered by the wheel in a direction to lock the jaws or in the opposite direction to release the jaws.

With the above and other objects in view, the invention may be said to comprise the chuck as illustrated in the accompanying drawings hereinafter described and particularly set forth in appended claims, together with such variations and modifications thereof as will be apparent to one skilled in the art to which the invention pertains.

Reference should be had to the accompanying drawings forming a part of this specification, in which.

Figure 1:
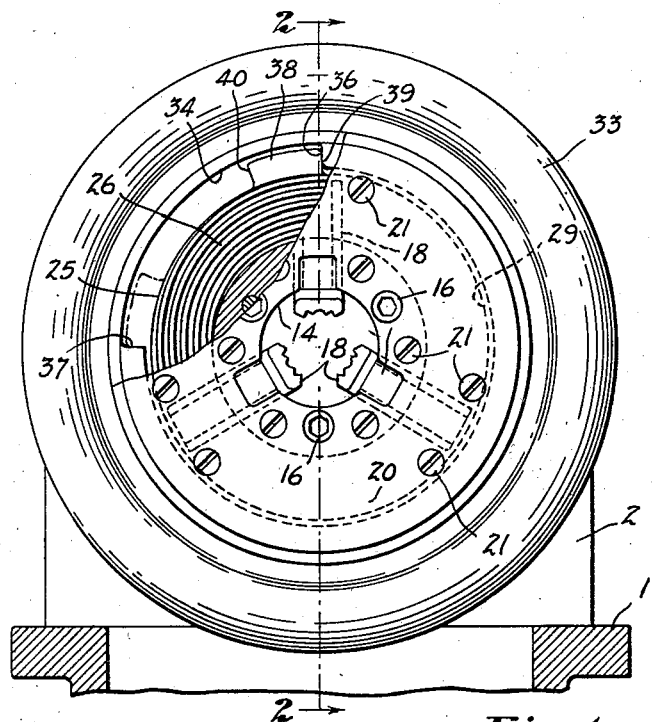
Fig. 1 is a front elevation of the chuck embodying the invention.
Figure 2:
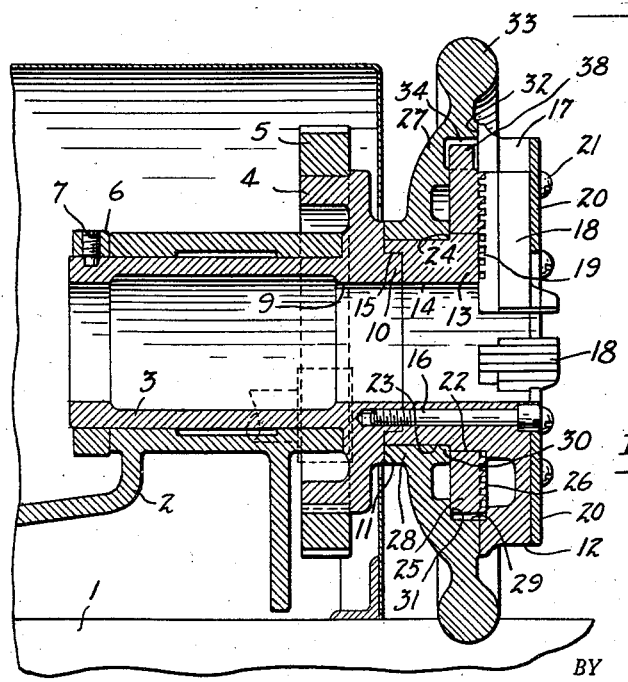
Fig. 2 is an axial section through the chuck, taken on the line indicated at 2—2 in Fig. 1.

Referring to the accompanying drawings, a suitable support such as a lathe bed 1 carries a bearing bracket 2 in which is journaled a horizontal tubular shaft 3. The shaft 3 has an outwardly projecting flange 4 at its outer end, which provides a support for a gear 5 through which the shaft may be driven. The flange 4 provides a shoulder for engagement with the outer end of the bearing, and the shaft is held against endwise movement in the bearing by a collar 6, which may be detachably secured to the shaft at the inner end of the bearing by means of a screw 7. The shaft 3 has an axial bore 9 and the outer face of the flanged outer end is provided with an external cylindrical projection 10 that is concentric with the bore 9. The flange 4 has a flat shoulder or face 11 outwardly of the projection 10 and the projection 10 and shoulder 11 serve to position a chuck body 12 that is attached to the outer end of the shaft 3.

The chuck body has an inwardly extending hub 13 and an axial bore 14 that extends through the hub and registers with the bore 9 of the shaft, the inner end of the hub 13 having a counterbore 15 to receive the projection 10. The outer face of the projection 10 bears against the bottom of the counterbore 15 and the inner end of the hub 13 bears against the shoulder 11 of the flange 4 so as to properly aline the chuck body with the shaft. The chuck body is detachably secured to the shaft 3 by means of bolts 16 that extend axially through the body 12 and hub 13 into the outer end of the shaft 3. The chuck body 12 is provided with radial slots 17 that extend to the bore 14 and which open to the front and rear faces of the body 12 outwardly of the hub. Clamping jaws 18 are slidably mounted in the slot 17 and each jaw is provided with a toothed rear face 19. The outer sides of the slots 17 are closed by a retaining plate 20 which is detachably held in place by means of screws 21. The plate 20 serves to hold the clamping jaws 18 in place and is removable to permit removal of the clamping jaws.

The exterior of the hub 13 of the chuck body is provided with an outer bearing portion 22, an inner bearing portion 23 of less diameter than the bearing portion 22 and a shoulder 24 at the outer end of the bearing portion 23. A scroll disk 25 is rotatably mounted upon the outer bearing portion 22 of the hub and has a spirally toothed outer face 26 that engages the toothed face of the clamping jaws 18 to move the jaws radially inwardly or outwardly upon turning movements of the disk 25 with respect to the chuck body.

A hand wheel 27 has a hub portion 28 that is rotatably mounted upon the inner bearing portion 23 of the hub 13 and held against axial movements on the hub by the shoulders 11 and 24. The hand wheel 27 has a recess 29 in its front face to receive the scroll disk 25 which is housed within the hand wheel. The hand wheel encloses the disk 25 and holds the same in engagement with the toothed faces of the clamping jaws 18. On its outer face the hand wheel 27 has an inner annular bearing portion 30 that engages the shoulder 24 of the hub and the inner face of the disk 25 immediately adjacent the hub. A second annular bearing face 31, spaced radially outwardly from the bearing face 30, engages the inner face of the disk 25 adjacent its periphery. The hand wheel also has an outer annular bearing face 32 surrounding the recess 29 which bears against the inner face of the chuck body 12. The hand wheel 27 has a peripheral hand grip portion 33 beyond the peripheries of the chuck body and disk, and this peripheral portion of the hand wheel is of considerable weight so that the hand wheel, which has an impact driving connection with the scroll disk, can have an effective hammering action on the scroll disk.

Suitable means is provided for driving the disk 25 by the hand wheel 27, through impact shoulders that permit sufficient free angular movement between the hand wheel and disk to enable the disk to be locked to the clamping jaws by a hammering action of the hand wheel when the jaws are in gripping engagement with the work.

As herein shown, an arcuate recess 34 is formed in the periphery of the recess 29 in the hand wheel and this recess provides angularly spaced impact shoulders 36 and 37 on the hand wheel. The disk 25 has a radially projecting lug 38 that extends into the recess 34 and that has impact shoulders 39 and 40 on the opposite faces thereof, with which the impact shoulders 36 and 37 of the hand wheel are engageable. The circumferential spacing of the shoulders 36 and 37 at the ends of the arcuate recess 34 is sufficient to permit the lug 38 of the disk 25 to move through a substantial angle in the arcuate recess 34. By turning the hand wheel back and forth through the angle permitted by the lug 38, sharp impacts may be imposed upon the lug 38 either in a direction to lock the jaws in gripping position, or in a direction to release the jaws from the work.

It is to be understood that variations and modifications of the specific device herein shown and described for purposes of illustration, may be made without departing from the spirit of the invention.

What I claim is:

1. A chuck comprising a body having a central opening and an inwardly projecting hub, said body having radial slots opening to the rear face of the body outwardly of the hub and to the central opening, said hub having an outer bearing portion adjacent the body, a smaller bearing portion at its inner end and a positioning shoulder at the inner end of the outer bearing portion, jaws slidable in said slots and having toothed rear faces, a scroll disk rotatable on the outer bearing portion of the hub and engaging said toothed faces to adjust the jaws, a hand wheel rotatably mounted on the inner bearing portion of the hub and positioned by said shoulder, said hand wheel having a recess to receive the scroll plate and bearing portions for engagement with the inner face of the disk and said shoulder, interengaging means on said wheel and disk arranged to permit limited turning movements of the wheel with respect to the disk and providing a direct impact driving connection between said wheel and said disk, a driving member axially alined with the chuck, and means for attaching the chuck to said member with the hub in engagement therewith, said member having a hand wheel positioning shoulder.

2. A chuck comprising a body having a central opening and an inwardly projecting hub, said body having radial slots that are open to the rear face of the body outwardly of the hub and that extend to said central opening, clamping jaws slidable in said slots and having toothed rear faces, a scroll disk rotatably mounted on the hub and engaging said toothed faces, said disk having a peripheral radially projecting impact lug, and a hand wheel rotatable on the hub and having a recess to receive said disk, said recess having a peripheral portion closely overlying the periphery of the disk, said peripheral portion having an arcuate recess to receive said impact lug and impact shoulders at opposite ends of said recess, the front face of said hand wheel having an annular bearing face engageable with the chuck body outwardly of said disk receiving recess and an annular bearing face engageable with the inner face of said disk.

3. A chuck comprising a driving and supporting member having an axial bore and a front face provided with an externally cylindrical projection concentric with the bore and a positioning shoulder at the inner end of the projection, a chuck body having an inwardly extending hub and an axial bore through the body and hub, said body having radial slots extending to the bore and open at the rear side of the body outwardly of the hub, said hub having an outer bearing portion adjacent the body, an inner bearing portion of less diameter than the outer and a positioning shoulder between the bearing portions, the inner end of the hub having a counterbore to receive the projection of the driving member, axial bolts for detachably securing the chuck to the driving member, jaws slidable in said radial slots and having toothed rear faces, a scroll disk mounted on the outer bearing portion of the hub and engaging the toothed faces of said jaws, a hand wheel rotatable on the inner bearing portion of the hub and held against axial movements by the positioning shoulders of the hub and driving member, said hand wheel having a recess in its front face to receive said scroll disk and an annular bearing face engageable with the inner face of the disk, and interengaging means on said wheel and disk arranged to permit limited turning movements of the wheel with respect to the disk and providing an impact driving connection between said hand wheel and disk.

CARL J. OETZEL.

REFERENCES CITED

The following references are of record in the file of this patent:

UNITED STATES PATENTS

| Number | Name | Date |
|---|---|---|
| 341,278 | Sands | May 4, 1886 |
| 1,548,949 | Horton | Aug. 11, 1925 |
| 1,473,464 | Church | Nov. 6, 1923 |